United States Patent

Shinchi

[11] Patent Number: 6,012,955
[45] Date of Patent: Jan. 11, 2000

[54] TERMINAL FOR ULTRASONIC CONNECTION AND ULTRASONIC CONNECTION STRUCTURE

[75] Inventor: Akira Shinchi, Shizuoka-ken, Japan

[73] Assignee: Yazaki Corporation, Tokyo, Japan

[21] Appl. No.: 09/004,610

[22] Filed: Jan. 8, 1998

[30] Foreign Application Priority Data

Jan. 9, 1997 [JP] Japan .................................... 9-002322

[51] Int. Cl.[7] .................................................. H01R 4/02
[52] U.S. Cl. ............................................ 439/874; 439/656
[58] Field of Search .................................. 439/874, 656, 439/404, 397

[56] References Cited

U.S. PATENT DOCUMENTS

| | | | |
|---|---|---|---|
| 2,503,559 | 4/1950 | Miloche | 439/874 |
| 3,842,487 | 10/1974 | Hartz | 439/874 |
| 4,717,354 | 1/1988 | McCleerey | 439/874 |
| 4,883,430 | 11/1989 | Siemon et al. | |
| 5,127,577 | 7/1992 | Lynch, Jr. et al. | |
| 5,541,365 | 7/1996 | Sugiura et al. | 439/874 |

FOREIGN PATENT DOCUMENTS

| | | |
|---|---|---|
| 7-70345 | 7/1995 | Japan . |
| 1019606 | 2/1966 | United Kingdom . |
| 2244872 | 12/1991 | United Kingdom . |
| 9800193 | 5/1998 | United Kingdom . |

Primary Examiner—Steven L. Stephan
Assistant Examiner—J. F. Duverne
Attorney, Agent, or Firm—Finnegan, Henderson, Farabow, Garrett & Dunner, L.L.P.

[57] ABSTRACT

A terminal (20) lies, together with an insulated electric wire (8) having a superposed relation therewith, between a bottom of a groove (13) of a first member (11) and a vertex face (15) of a protrusion (14) of a second member (12), and is subjected together with the insulated electric wire (8) to a sequence of ultrasonic vibrations under pressures exerted via the first and second members (11,12) so that an insulation of the insulated electric wire is melted and the terminal is current-conductively contacted to a core wire of the insulated electric wire, wherein the terminal has at a connection part (21) thereof to be connected to the insulated electric wire an engaging portion (22) engageable with a side face of the protrusion (14) having an engagement portion to be engaged therewith.

5 Claims, 4 Drawing Sheets

TERMINAL FOR ULTRASONIC CONNECTION AND ULTRASONIC CONNECTION STRUCTURE

BACKGROUND OF THE INVENTION

1. Field of the Invention

The present invention relates to a terminal to be connected for current conduction with an insulated electric wire by way of an ultrasonic connection using ultrasonic energy, and to an ultrasonic connection structure in which such a terminal is connected to an insulated electric wire by means of ultrasonic energy.

2. Description of Relevant Art

Techniques for ultrasonic connection have been disclosed in Japanese Patent Publication No. 7-70345. FIGS. 1A to 1D illustrate the techniques, which employ a pair of opposing plate members that FIG. 1A shows as a first member 1 and a second member 2. The first and second members 1, 2 are made of an ultrasonically weldable plastic material. The first member 1 is formed with grooves 3, and the second member 2, with protrusions 4 to be fitted in the grooves 3.

FIGS. 1B and 1C illustrate an intermediate step of the ultrasonic connection, where a respective groove 3 of the first member 1 receives a terminal 7 and an insulated electric wire 8 to be put thereon. The groove 3 has small concave parts 3a at its bottom. An opposing protrusion 4 has on its vertex face corresponding small convex parts 4a engageable with the concave parts 3a.

As in FIGS. 1B and 1C, the terminal 7 is laid along the bottom of groove 3, and the insulated electric wire 8 is put thereon. Then, the second member 2 is mated to the first member 1 so that the protrusions 4 fit in the grooves 3. Then, with pressures acting between the first and second members 1, 2, ultrasonic vibrations are applied therebetween, causing an insulating cover of the electric wire 8 to be melted between protrusion 4 and groove 3, having its core wire current-conductively contacted to the terminal 7. Concurrently, the first and second members 1, 2 are welded together into an integral connection structure, like FIG. 1D.

In the conventional ultrasonic connection, the terminal 7 and the core wire have a conductive contact secured therebetween, as they are pressed together by a pair of upper and lower welded members 1, 2, which however are made of a resin that shrinks when the temperature is low. FIG. 2 illustrates such a situation, where the pressing tendency is reduced with counteracting forces P1, P2 due to a shrunk protrusion 4 in a groove 3, causing an increased contact resistance between a terminal 7 and a core wire 8a.

SUMMARY OF THE INVENTION

The present invention has been achieved with such points in view.

It therefore is an object of the present invention to provide a terminal for ultrasonic connection permitting a contact resistance to be maintained relative to a core wire even with a thermal shrink of a resin member pressing the core wire against the terminal.

It also is an object of the present invention to provide an ultrasonic connection structure permitting a contact resistance to be maintained between a terminal and a core wire even with a thermal shrink of a resin member pressing the core wire against the terminal.

To achieve such the object, a first aspect of the invention provides a terminal for an ultrasonic connection where it lies, together with an insulated electric wire having a superposed relation therewith, between a bottom of a groove of a first member and a vertex face of a protrusion of a second member and it is subjected together with the insulated electric wire to a sequence of ultrasonic vibrations under pressures exerted via the first and second members so that an insulation of the insulated electric wire is melted and the terminal is current-conductively contacted to a core wire of the insulated electric wire, wherein the terminal has at a connection part thereof to be connected to the insulated electric wire an engaging portion engageable with a side face of the protrusion having an engagement portion to be engaged therewith.

According to the first aspect, a terminal has at a connection part thereof to be connected to an insulated electric wire an engaging portion engageable with a protrusion of a second member, and is adapted to move together with a core wire of the electric wire that may have a deviated position due to a thermal shrunk resin member, so that a contact load is maintained between the terminal and the core wire, suppressing an unfavorable increase in contact resistance, permitting an improved stable connection at the terminal part to be connected to the electric wire by way of ultrasonic connection.

According to a second aspect of the invention, the connection part to be connected to the insulated electric wire comprises a bottom wall for the insulated electric wire to be placed thereon and a pair of vertical walls either standing at both sides of the bottom wall, and the engaging portion comprises a pair of engaging pawls either cut in the vertical walls and inwardly raised therefrom.

According to the second aspect, the engaging portion is formed simply by cutting an engaging pawl in a respective vertical wall and raising it therefrom.

According to a third aspect of the invention, the connection part to be connected to the insulated electric wire comprises a bottom wall for the insulated electric wire to be placed thereon and a pair of engaging pieces either standing at both sides of the bottom wall, and the engaging portion comprises a pair of engaging pawls constituted with inwardly folded free ends of the engaging pieces.

According to the third aspect, the engaging portion is formed simply by folding free ends of engaging pieces.

Further, to achieve the object described, a fourth aspect of the invention provides an ultrasonic connection structure, wherein a terminal is connected to an insulated electric wire by way of an ultrasonic connection where it lies, together with the insulated electric wire having a superposed relation therewith, between a bottom of a groove of a first member and a vertex face of a protrusion of a second member and it is subjected together with the insulated electric wire to a sequence of ultrasonic vibrations under pressures exerted via the first and second members so that an insulation of the insulated electric wire is melted and the terminal is current-conductively contacted to a core wire of the insulated electric wire, wherein the terminal has at a connection part thereof to be connected to the insulated electric wire an engaging portion engageable with a side face of the protrusion having an engagement portion to be engaged therewith.

According to the fourth aspect also, a terminal has at a connection part thereof to be connected to an insulated electric wire an engaging portion engageable with a protrusion of a second member, and is adapted to move together with a core wire of the electric wire that may have a deviated position due to a thermal shrunk resin member, so that a contact load is maintained between the terminal and the core wire, suppressing an unfavorable increase in contact resistance, permitting an improved stable connection at the terminal part to be connected to the electric wire by way of ultrasonic connection.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIGS. 1A to 1D illustrate a conventional ultrasonic connection, where FIG. 1A is a perspective view of constructions of first and second members, FIG. 1B, a longitudinal section showing a state with a terminal and an insulated electric wire accommodated in a groove of the first member, FIG. 1C, a front view showing the state, and FIG. 1D, a longitudinal section showing a state with the connection completed;

DETAILED DESCRIPTION OF THE PREFERRED EMBODIMENTS

Figure 1A:
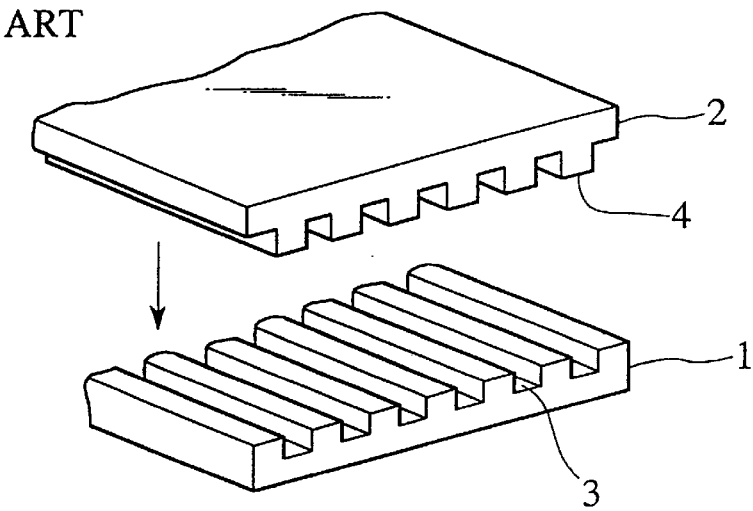
Figure 1B:
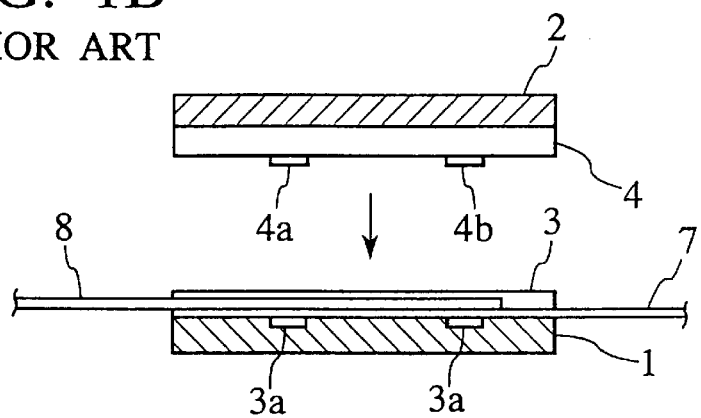
Figure 1C:
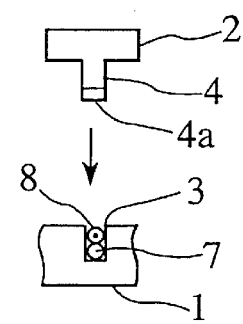
Figure 1D:
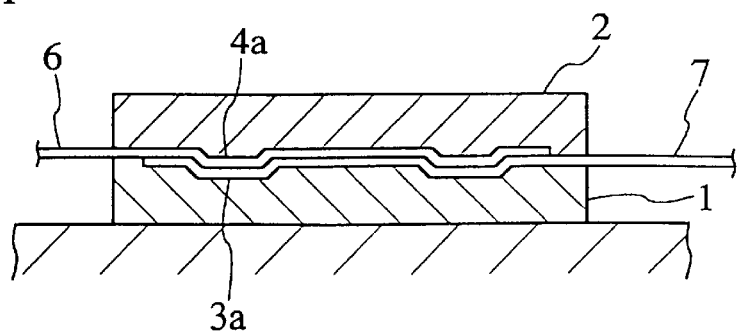
Figure 2:
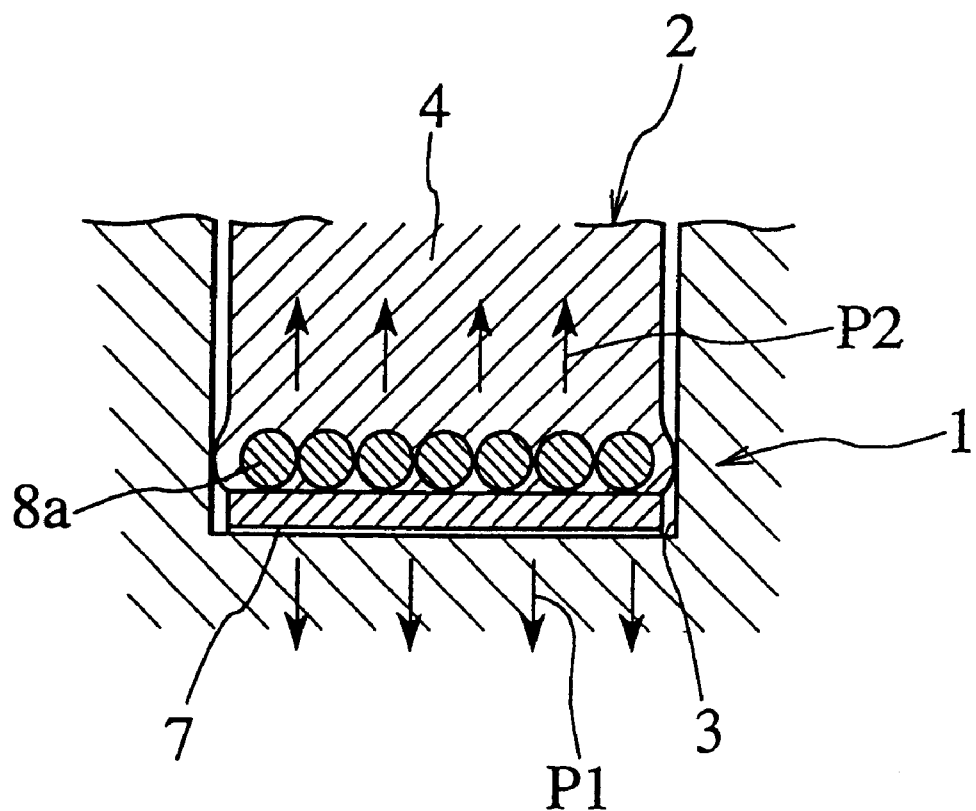
FIG. 2 is a section of an ultrasonic connection structure made by the conventional ultrasonic connection.

The contents of U.S. Pat. No. 5,584,122 are incorporated herein by reference.

There will be detailed below the preferred embodiments of the present invention with reference to the accompanying drawings. Like members are designated by like reference characters.

Figure 3:
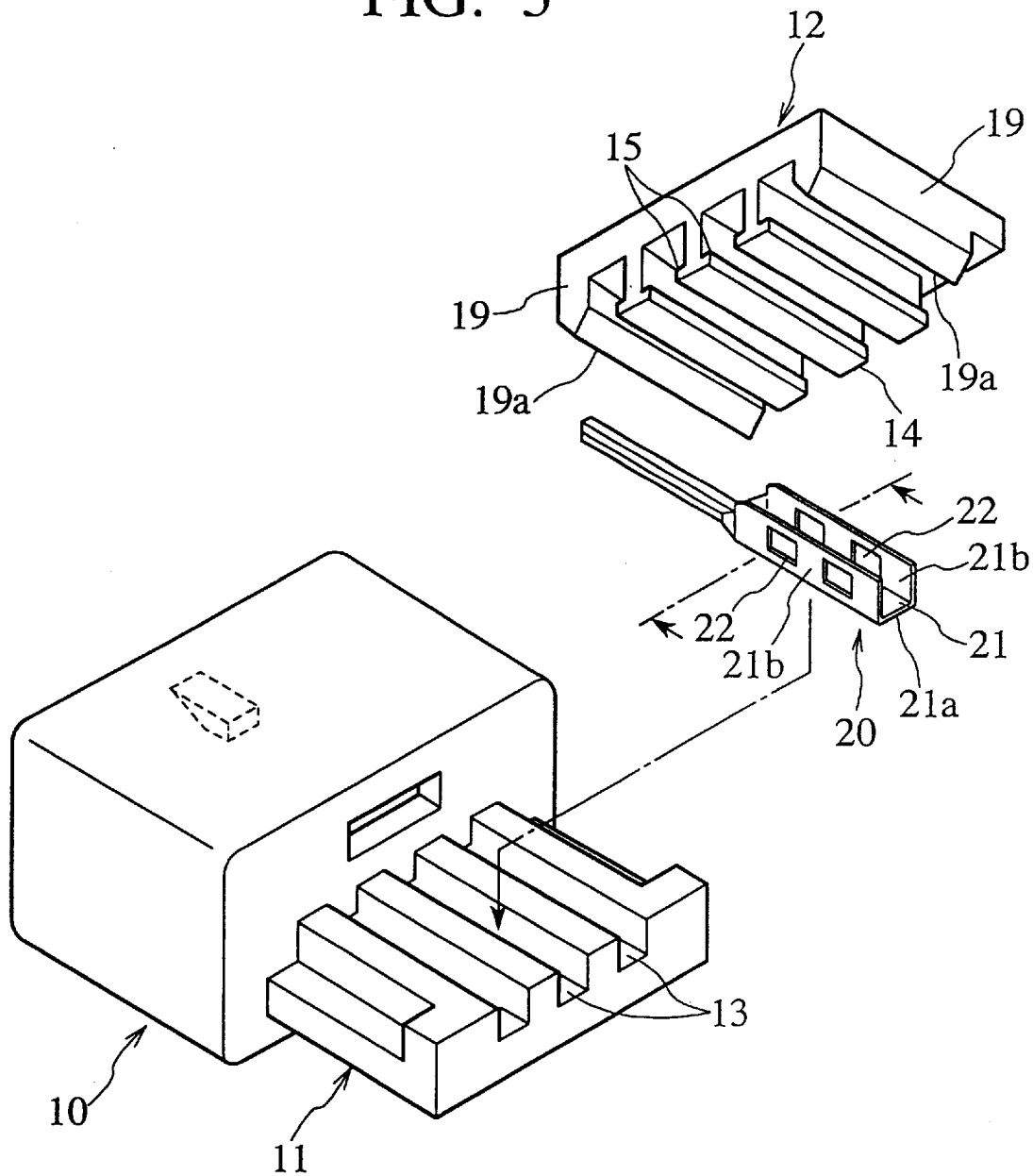
FIG. 3 is a perspective view illustrating the relationship between a terminal for ultrasonic connection, a main body of a connector housing and a cover member according to a first embodiment of the invention.
Figure 4:
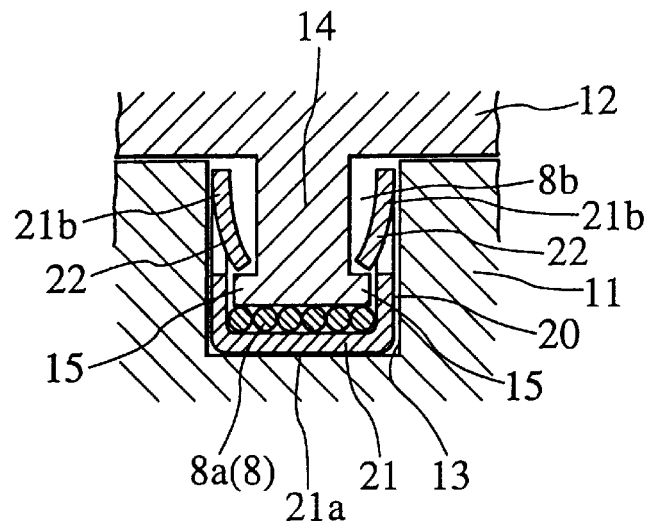
FIG. 4 is a section of an electric wire connection part constructed using the terminal for ultrasonic connection according to the first embodiment.

FIG. 3 is a perspective view illustrating the relationship between a terminal for ultrasonic connection, a main body of a connector housing (first member) and a cover member (second member) according to a first embodiment of the invention, and FIG. 4 is a section of an electric wire connection part constructed using the terminal for ultrasonic connection according to the first embodiment.

In the Figures, designated at reference character 10 is the main body of the connector housing, 12 is the cover member, and 20 is the terminal. The connector housing main body 10 and the cover member 12 are molded using ultrasonically weldable resin and on a rear end portion of the connector housing 10 there is projectively provided a terminal retaining portion 11. The cover member 12 is formed into a configuration closing this terminal retaining portion 11. A plurality of grooves 13 are provided in rows in the terminal retaining portion 11 and on the cover member 12 there are provided protrusions 14 fitted into the grooves 13. Also, a forward end of each protrusion 14 is formed into a configuration whose section is shaped like an inverted T and on both sides of the forward end as viewed in the width direction there are formed engaging convex parts (portions to be engaged) 15. Also, forward end portions 19a of both side walls 19 of the cover member 12 as viewed in the width direction are each sharpened so as to be ultrasonically welded to the terminal retaining portion 11 by being pressure contacted therewith.

On the other hand, the terminal 20 has at its rear end portion an electric wire connection part (the portion to which an insulated electric wire is connected) 21 which is horizontally thrown U shaped in cross section. The electric wire connection part 21 consists of a bottom wall 21a having the insulated electric wire placed thereon and a pair of left and right vertical walls 21b, 21b erected from both side edges of this bottom wall 21a. The interval between the pair of vertical walls 21b, 21b is set to be at a dimension which when the protrusion 14 of the cover member 12 has been inserted therebetween enables a specified gap to be ensured between the vertical wall 21b and the side surface of the protrusion 14.

Also, with respect to each of the left and right vertical walls 21b there are formed two engaging pawls (engaging portions) 22 projecting inwardly downwardly and obliquely. Each of these engaging pawls 22 is formed by forming a horizontally thrown U shaped cut in the vertical wall with only an upper end alone thereof remaining none cutted and inwardly bending the wall within the cutted zone, whereby the engaging pawls are made flexible by the upper ends thereof being continuous to the corresponding vertical wall 21b.

When constructing a connector by connecting the insulated electric wire 8 to this terminal 20, the electric wire connection part 21 of the terminal 20 is situated in the groove 13 provided in the terminal retaining portion 11 of the connector housing main body 10 and the insulated electric wire 8 is placed on the electric wire connection part 21. And, the cover member 12 is insulated thereonto, thereby inserting the protrusion 14 of the cover member 12 into the groove 13 of the terminal retaining portion 11. In this state, between the cover member 12 and the terminal retaining portion 11 (e.g., between the upper surface of the terminal retaining portion 11 and the lower surface of the cover member 12), a suitable gap is ensured in order to cause ultrasonic waves to be concentrated only on object portions.

In this state, ultrasonic vibration is applied (vertical vibration is applied) while the cover member 12 is being pressurized from above by means of an ultrasonic horn. Then, ultrasonic energy is concentrated on the protrusion 14 clamping the insulated electric wire 8 between itself and a bottom surface of the groove 13, whereby a covering portion of the insulated electric wire is molten and a core wire 8a is exposed. And, by the molten covering portion being abated to the ambient areas, the core wire 8a and the terminal 20 is contacted with each other and brought into electric conduction therebetween as shown in FIG. 4. At this time, by engagement of the engaging convex parts 15 at the forward end of the protrusion 14 of the cover member 12 with the engaging pawls 22 of the terminal 20, the electric wire connection part 21 of the terminal 20 is connected to the protrusion 14. Also, the sharpened forward end portions 19a of the side walls 19 on both sides of the cover member 12 as viewed in the width direction are welded to the terminal retaining portion 11, whereby an integral connector is completed.

In this structure, as the electric wire connection part 21 of the terminal 20 and the protrusion 14 are engaged with each other by way of the engaging pawls 22, even when the cover member 12 or connector housing main body 10 has been vertically shrunk due to a change in temperature, the electric wire connection part 21 moves along with the core wire 8a in a way to follow that movement. Accordingly, a stable contact load between the terminal 20 and the core wire 8a is always maintained as is, with the result that the increase in the contact resistance can be suppressed. Accordingly, the enhancement of the electric connection can be achieved. Also, as the engaging pawls 22 engaged with the engaging convex part 15 on the cover member 12 side are only formed in the terminal 20 by cutting this terminal and raising the cutted portions thereof, the resulting construction is simple and easy to realize.

Figure 5:
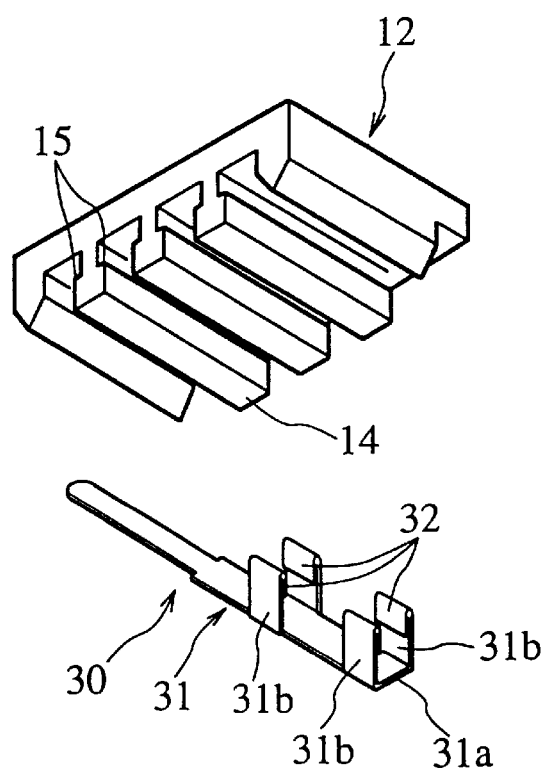
FIG. 5 is a perspective view of a terminal for ultrasonic connection and a cover member according to a second embodiment of the invention.

FIG. 5 shows a terminal 30 for ultrasonic connection according to a second embodiment of the invention.

An electric wire connection part 31 of this terminal 30 consists of a bottom wall 31a having the insulated electric wire placed thereon and four engaging pieces 31b erected on left and right side edges of the bottom wall 31a. Engaging pawls 32 are formed in inner surfaces of the forward ends of the engaging pieces 31b by folding back the forward ends thereof inwardly downwardly. When this terminal 30 is used also, the function is identical as in the first embodiment. However, in the case of this terminal 30, as the engaging pawls 32 are formed simply by folding back the forward ends of the engaging pieces 31b, the construction is simple.

While preferred embodiments of the present invention have been described using specific terms, such description is for illustrative purposes, and it is to be understood that changes and variations may be made without departing from the spirit or scope of the following claims.

What is claimed is:

1. A terminal ultrasonically connected to an insulated electric wire having a superposed relation therewith between a bottom of a groove of a first member and a vertex face of a protrusion of a second member, wherein the terminal is subjected together with the insulated electric wire to a sequence of ultrasonic vibrations under pressures exerted by the first and second members so that an insulation of the insulated electric wire is melted and the terminal is current-conductively contacted to a core wire of the insulated electric wire, and wherein the terminal, comprises:

a connection portion to be connected to the insulated electric wire; and an engaging portion engageable with a side face of the protrusion.

2. A terminal for an ultrasonic connection according to claim 1, wherein:

the connection portion to be connected to the insulated electric wire comprises a bottom wall for the insulated electric wire to placed thereon and a pair of vertical walls standing at both sides of the bottom wall; and the engaging portion comprises a pair of engaging pawls cut in the vertical walls and inwardly raised therefrom.

3. A terminal for an ultrasonic connection according to claim 1, wherein:

the connection portion to be connected to the insulated electric wire comprises a bottom wall for the insulated electric wire to be placed thereon and a pair of engaging pieces standing at both sides of the bottom wall; and the engaging portion comprises a pair of engaging pawls having inwardly folded free ends.

4. An ultrasonic connection structure, comprising:

a terminal according to claim 1 connected to an insulated electric wire having a superposed relation therewith by way of an ultrasonic connection between a bottom of a groove of a first member and a vertex face of a protrusion of a second member;

wherein the terminal is subjected together with the insulated electric wire to a sequence of ultrasonic vibrations under pressures exerted by the first and second members so that an insulation of the insulated electric wire is melted and the terminal is current-conductively contacted to a core wire of the insulated electric wire; and wherein the terminal has a connection portion to be connected to the insulated electric wire and an engaging portion engageable with a side face of the protrusion.

5. An ultrasonic connection structure, comprising:

a first member having a groove therein;

a second member having a protrusion; and a terminal having a connection part connected to an insulated wire having a superposed relation therewith, and an engaging portion engageable with a side face of the protrusion;

wherein the terminal and insulated wire are positioned between a bottom of the groove of the first member and a vertex face of the protrusion of the second member; and wherein the terminal and insulated wire are subjected to a sequence of ultrasonic vibrations under pressure exerted by the first and second members so that an insulation of the insulated wire is melted and the terminal conductively contacts a core wire of the insulated wire.

* * * * *